(12) United States Patent
Kellogg

(10) Patent No.: US 6,393,628 B1
(45) Date of Patent: May 28, 2002

(54) VALVE ASSEMBLY FOR SWIMMING POOL CLEANING SYSTEMS

(76) Inventor: James Edward Kellogg, Corporate Centre, Cnr. Slayter Ave. & Bundall Rd., Bundall, Gold Coast (AU), 4217

( * ) Notice: Subject to any disclaimer, the term of this patent is extended or adjusted under 35 U.S.C. 154(b) by 0 days.

(21) Appl. No.: 09/701,508
(22) PCT Filed: Jun. 2, 1999
(86) PCT No.: PCT/AU99/00427
§ 371 (c)(1),
(2), (4) Date: Nov. 30, 2000
(87) PCT Pub. No.: WO99/63184
PCT Pub. Date: Dec. 9, 1999

(30) Foreign Application Priority Data

Jun. 2, 1998 (AU) .............................. PP 3824

(51) Int. Cl.⁷ ................................. E04H 4/00
(52) U.S. Cl. ................. 4/490; 4/496; 4/507
(58) Field of Search ............. 4/490, 496, 507; 137/526, 527, 527.6; 210/169, 416.2

(56) References Cited

U.S. PATENT DOCUMENTS

| 735,912 A | * | 8/1903 | Schrotz |
| 1,505,958 A | * | 8/1924 | Huntting |
| 2,285,756 A | * | 6/1942 | Schweighart |
| 2,927,596 A | * | 3/1960 | Carlson |
| 3,509,908 A | * | 5/1970 | Latham et al. |
| 3,726,308 A | * | 4/1973 | Eberhardt |
| 3,990,471 A | * | 11/1976 | Schutzer et al. |
| 4,149,562 A | * | 4/1979 | Johnson et al. |
| 4,378,254 A | * | 3/1983 | Chauvier |
| 4,508,139 A | * | 4/1985 | Teumer |
| 4,605,041 A | * | 8/1986 | Teumer |
| 4,683,599 A | | 8/1987 | Rief |
| 4,825,902 A | * | 5/1989 | Helms |
| 4,860,790 A | * | 8/1989 | Scaramucci |
| 5,105,848 A | | 4/1992 | Kallenbach |
| 5,351,709 A | | 10/1994 | Vos |
| 5,477,879 A | | 12/1995 | Vos |
| 5,904,171 A | * | 5/1999 | Stahle et al. |

FOREIGN PATENT DOCUMENTS

| AU | 67686/90 | 6/1991 |
| AU | 41885/93 | 1/1996 |
| FR | 75 01063 | 8/1976 |

* cited by examiner

Primary Examiner—Gregory L. Huson
Assistant Examiner—Khoa Huynh
(74) Attorney, Agent, or Firm—Shoemaker and Mattare

(57) ABSTRACT

A valve assembly (23) for use with automatic swimming pool cleaners which is arranged in a skimmer and in series with the suction pipe (22) to the pool cleaner. It includes a branch passage provided with a biased pivoting flap valve (31) opening in accordance with the pressure demands in the system to relieve pressure and provide constant suction to the cleaner and permits the skimming action of the skimmer to continue whilst the swimming pool cleaner is operating. The bias is provided by a coil or leaf spring or an arcuate compression coil spring located substantialy within the passage. Two flap valves (optionally with different surface areas and spring constants) may be provided and optionally angled to the passage when closed. Hinge pins of the flap may snap fit into open sided sockets in the branch passage wall.

17 Claims, 6 Drawing Sheets

VALVE ASSEMBLY FOR SWIMMING POOL CLEANING SYSTEMS

TECHNICAL FIELD

This invention relates to valve assemblies and in a particular but not exclusive aspect to valve assemblies for use with swimming pool cleaning systems particularly cleaning systems of the type in which a vacuum head automatically traverses the pool.

BACKGROUND OF THE INVENTION

It is usually desirable to control and regulate the amount of suction to an automatic pool cleaner. If there is insufficient suction, the cleaner will operate slowly or not at all and if there is too much suction, the cleaner is subject to premature wear and may clamp down and stick to the pool surfaces. Further the cleaner hose may also collapse if suction is excessive.

There are gradual and sharp changes in negative pressure (suction) with all automatic pool cleaners of this type. Gradual changes include load changes as the cleaner moves about, E and changes depth in the normal course of operation and suction decreases as the filter and leaf baskets associated with the system fill with debris. Sharper changes are caused by spikes that are inherent in the design of many cleaners caused by quickly and repeatedly opening and closing the water flow which propels the cleaner. There may also be a sharp rise in negative pressure caused by a blockage at the cleaner.

In some systems, the hose of a pool cleaner interferes with the function of the weir door of the skimmer box. The purpose of the weir door is to isolate the interior of the skimmer box from the body of water in the pool and prevent debris reentering the pool. When however a vacuum cleaner hose is connected via a weir door, debris collected in the weir can pass back into the pool.

U.S. Pat. No. 5,570,713 describes a valve and a method of operating a valve which has an inlet, an outlet, a bypass inlet and a pivoting cover mechanism for controlling the cover in order to provide a relief through the valve. The valve described in U.S. Pat. No. 5,570,713 is its designed for use with a swimming pool vacuum and skimming system similar to that described in another U.S. Pat. No. 5,581.826. The systems described in the aforementioned U.S. patents are now common and the function of vacuuming a pool and skimming the surface of the pool water can be carried out independently or simultaneously. The arrangements disclosed in the above patents however do not overcome all of the abovementioned disadvantages.

The present invention aims to overcome or alleviate one or more of the above disadvantages by providing in one aspect an improved valve assembly which has particular but not exclusive application to use with swimming pool cleaners which operates efficiently, which will easily fit an existing system and which will compensate automatically for changes in suction pressure to the cleaner and which also may be used in such a manner that skimming of the pool may continue whilst a pool cleaner is operating. The present invention in a filer aspect aims to provide an improved valve assembly which may be used in other applications not limited to swimming pool applications. Other objects and advantages of the present invention will become apparent from the following description.

DISCLOSURE OF THE INVENTION

According to a first aspect of the present invention, there is provided a valve assembly for pool cleaning apparatus, said valve assembly being arranged in use in the suction line of said pool cleaning apparatus and including a main body defining a main flow passage, an inlet to the main flow passage for connection to said pool cleaning apparatus and an outlet from the main flow passage for connection to the suction line and a branch body extending from said main body and defining a branch passage communicating with said main flow passage, said branch passage terminating in an inlet opening, valve flap means mounted to said branch body for pivotal movement between a closed position closing said branch passage and an open position in which liquid flows from said inlet opening and through said branch passage into said main flow passage., and spring biasing means disposed substantially within said branch body and biasing said valve flap means towards said closed position, said biasing means having a first end acting on the side of said valve flap means opposite said inlet opening and a second end acting against said branch body rearwardly of said valve flap means whereby said biasing means does not impede flow through said branch passage upon opening of said valve flap means, said biasing means permitting said valve flap means to pivot between said open position and said closed position in response to suction pressure requirements of said pool cleaning apparatus.

The biasing means suitably controls the opening of the valve flap means so that the extent that the flap means opens is in direct proportion to changes in pressures requirements of the pool cleaning apparatus.

Preferably, the branch body includes opposite side walls and the valve flap means is pivotally mounted to the opposite side walls via pivot axle means. Suitably the biasing means comprises a coil spring around the axle means, said coil spring terminating in first and second legs, the first leg acting against the valve flap means and the second leg acting against the branch body.

Preferably, the pivot axle means comprises a pair of opposite axles and the biasing means includes a pair of coil springs around respective axles. Suitably the springs are integrally formed and the first legs thereof comprise a common U-shaped leg. Preferably, the axles are formed integrally with valve flap means.

Preferably, the opposite side walls of the branch body have sockets for receiving the axle means, the sockets having a restricted entry portion which enables the axle means to be moved into and out of the sockets only in one attitude of the axle means. The sockets are suitably of part circular form being complementary to a bearing surface of the axles. Alternatively, the flap means may be supported by a separate axle or axles supported by opposite walls of the branch body and a single coil spring arrangement provided centrally of the flap means.

In a further form, the biasing means comprises a leaf spring having a first and second legs acting against the rear of the valve flap means and branch body respectively.

Suitably, the branch body includes a top wall extending between the side walls, the flap means being pivotally mounted to the side walls adjacent the top wall and the second end of the biasing means acting against an inner surface of the top wall. Suitably, also, the branch body includes a lower wall extending between the side walls and the distance between the pivot axle means and a distal edge of the valve flap means is predetermined so that the valve flap means is restrained from pivoting in an outward direction beyond its closed position by contact with the lower wall. Alternatively, stop means may be provided to limit movement of the valve flap means outwardly of the branch passage. Such means may comprise an abutment on a wall of the branch passage. In this configuration, the valve flap means in the closed position may be inclined inwardly or substantially at right angles to the branch passage.

In yet a further arrangement, the biasing means may comprise a coil spring having one end acting on the rear of the valve flap means and the other end received in a housing comprising an extension of the branch body.

Most preferably, the branch body extends from the body substantially at right angles. This allows the branch passage to be located adjacent the outlet of the main flow passage and thus the inlet opening to the branch passage to be positioned adjacent to the vacuum plate which will minimize the risks of a vortex being created in use and air being drawn into the pool pump.

The inlet to the valve assembly body may comprise an elbow. The valve inlet can be arranged to accommodate male hose ends and a tapered adapter accessory so that the valve inlet may accommodate hose ends of differing sizes and configurations.

The valve flap means may comprise a single flap or alternatively a pair of flaps which may be substantially coplanar in the closed position or which form a dihedral in the closed position. Alternatively, one flap may overlap the other flap in the closed position. The flaps however are suitably arranged to operate independently. In one arrangement, the biasing means for one flap is greater than that of the other flap so that one opens and closes ahead of the other. This may also be achieved by having the flaps of different sizes. The respective flaps may have complementary end portions which cooperate in the closed position of the valve flap means. Alternatively, the respective flaps may be in an end to end relationship in the closed position of the valve flap means. Stop means may provided to limit outward movement of the flaps or respective flaps.

According to another aspect of the present invention there is provided a method of vacuuming a swimming pool of the type having a skier box and vacuum plate within the skimmer box while simultaneously skimming the surface of the body of water within the pool, the method including the steps of engaging the outlet of the main body of the valve assembly of the above described type with the vacuum plate of a pool skimmer box and connecting a vacuum cleaner hose to said valve assembly.

In operation, the valve flap means opens up to maximum by-pass to maintain water supply to the pool and prevent the pool pump from burnout and also enables skimming of the water of debris while using the automatic pool cleaner. In the valve assembly of the invention, the greater the suction applied by the pump, the more the valve flap means opens proportionately increasing the skimming function of the cleaning system. The lower the suction, the more the valve closes diverting needed suction to operate the in-pool cleaner efficiently. A further

BRIEF DESCRIPTION OF THE DRAWING

In order that the invention may be more readily understood and put into practical effect, reference will now be made to the accompanying drawings which illustrate a preferred embodiment of the invention and wherein.

DETAILED DESCRIPTION OF THE PREFERRED EMBODIMENTS.

Figure 1:
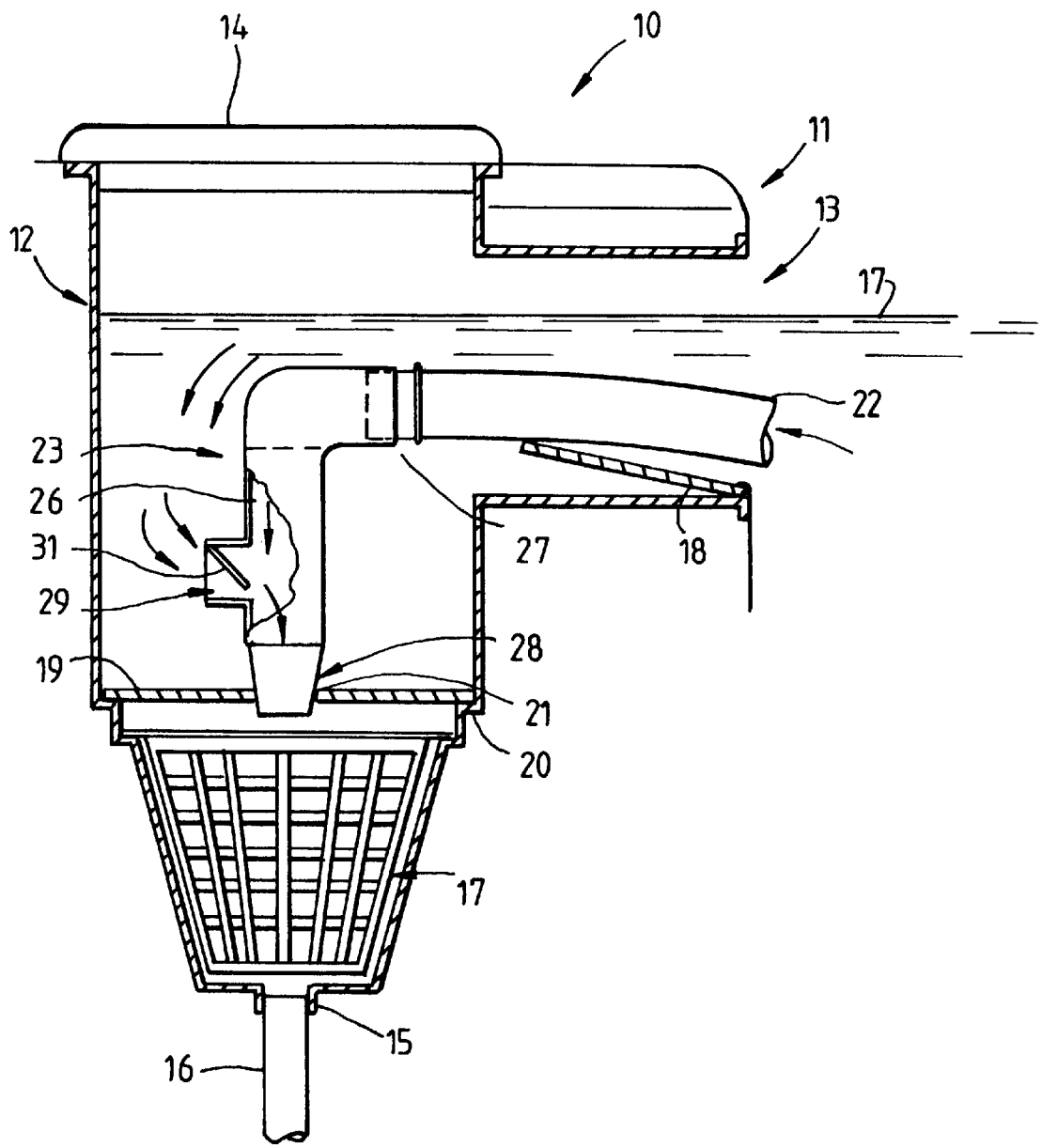
FIG. 1 is a part sectional view of a swimming pool skimmer box including a control valve assembly and cleaner hose connection according to an embodiment of the present invention.

Referring to the drawings and firstly to FIG. 1. there is illustrated a conventional skimmer box 10 for a pool which is normally incorporated into the side wall 11 of a pool and which includes a hollow chamber 12 and a throat. 13 which defines a weir communicating with the interior of the pool and defining an inlet into the chamber 12. A removable access lid 14 is provide atop the chamber 12. The chamber 12 is provided at its lower end with an outlet 15 which is connected to a suction conduit 16 leading to a pool pump. The water level 17 in the pool is usually adjusted so as to be at the level of the throat 13 such that when the pump is operated, water is drawn in through the throat 13 for passage through the outlet 15 and conduit 16 to the pool pump and associated filtering equipment. To collect leaves and other debris and prevent or minimise the passage of such materials to the pool pump, a removable leaf basket 17 is positioned in the chamber 12 between the throat 13 and outlet 15. A hinged flap 18 is provided at the entrance to the throat 13, the flap 18 being normally upright and closed when the pool pump is off. For this purpose the flap 18 may constructed of or include a buoyant material. Additionally or alternatively, the flap 18 may be biased by a light spring to the upright position. When suction is applied by the pool pump, the flap 18 is drawn downwardly allowing debris to enter the chamber 12.

For connection of a suction cleaner a removable vacuum plate 19 may be located within the skimmer box 10 usually seating on a flange or shoulder 20 therein. The vacuum plate 19 has a central opening 21 normally for connection of a suction pipe 22 of a vacuum head or automatic swimming pool cleaner such that water and other materials are drawn through the vacuum head with debris being collected in the basket 17. It will be apparent however that when a vacuum head or automatic cleaner is connected to the vacuum plate through the pipe 21, there will be no skimming action as all suction is applied through the pipe 22.

To enable the vacuum head or cleaner to be operated whilst at the same time maintaining a skimming function in the skimmer box 10 and for governing the suction pressure of the swimming pool cleaner, the valve assembly 23 shown in one embodiment in FIG. 1 is used.

Figure 2:
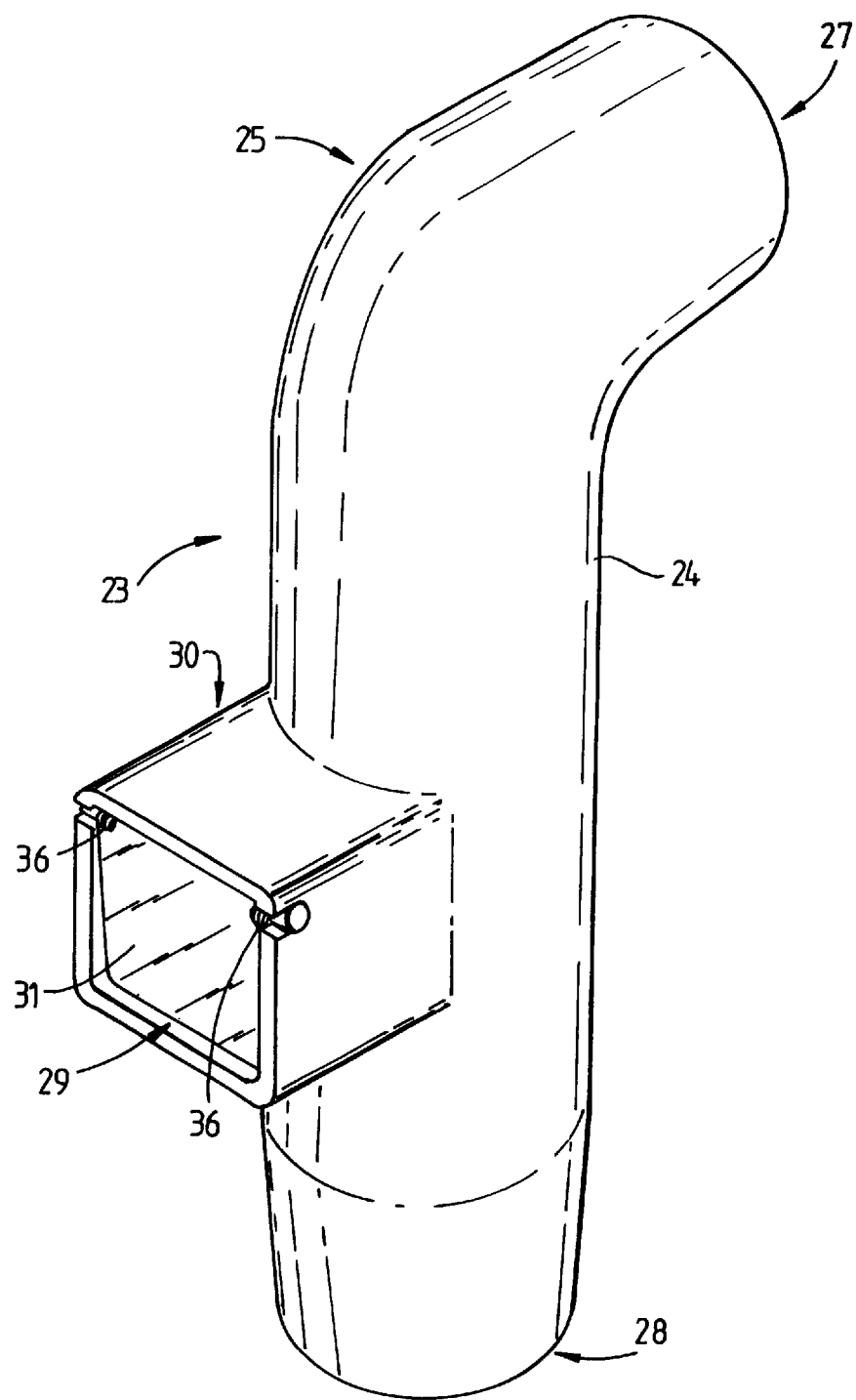
FIG. 2 illustrates in perspective view, the control valve assembly of an embodiment of the invention.

The valve assembly 23 as also shown in FIG. 2 has a generally L-shaped body 24 of tubular cross section the upper end of which is formed as an elbow 25, the body 24 defining a main fluid flow passage 26 and including an inlet 27 to and an outlet 28 from the passage 26. The body 25 adjacent the outlet 28 may be tapered to enable it to be inserted in a sealing fashion into the opening 21 of the vacuum plate 19 whilst the length of the body 24 is such that the elbow 25 and thus the inlet 27 is located, adjacent or in alignment with the throat 13, so as to enable it to be connected to the suction pipe 22 leading to the pool cleaner, the suction pipe 22 passing out through the throat 12 and being positioned over the partially opened flap 18 (see FIG. 1).

Located towards the outlet 28 of the body 24 is a branch passage 29 in this embodiment defined by a tubular body 30 of substantially rectangular or square cross section. A hingedly mounted flap valve member 31 is provided at the outer end of the branch passage 29 and is normally biased into a closed position with the pool pump not operating.

The arrangement illustrated allows a pool vacuum cleaner to be operated and at the same time the surface of the body of water in the pool can be skimmed of debris as indicated by the path arrows in FIG. 1. Thus when the pool pump is operating, water is drawn from the pool cleaner to the pool pump via the conduit 22 and valve assembly 23 and debris skimmed from the surface 17 of the pool water is also drawn into the valve assembly 23 via the branch passage 29 with the suction provided by the pool pump causing the flap 29 to open against its bias as indicated by the arrows in FIG. 1. The hinged flap member 31 is drawn open in proportion to the amount of suction created by the pump and the suction demands of the pool cleaner. The flap member 31 is normally biased to a closed position until the pool pump is activated.

Figures 3, 4, 5:
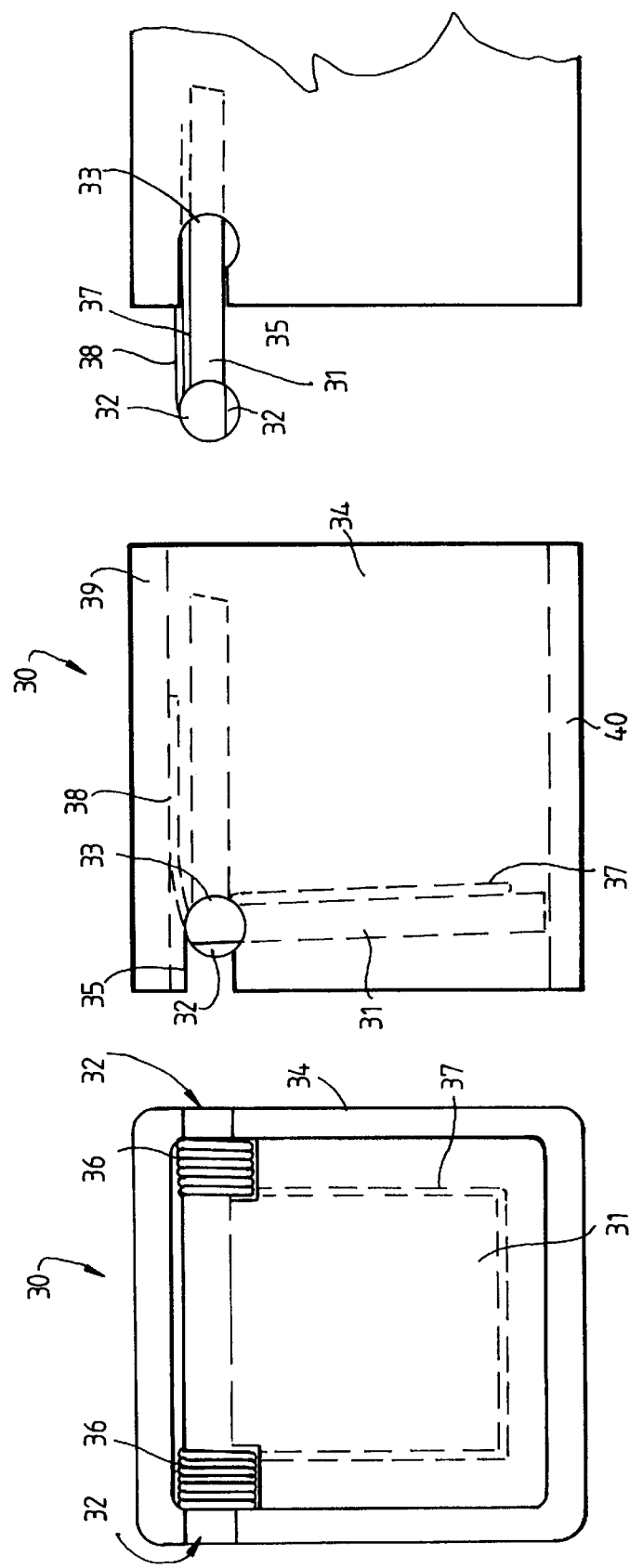
FIGS. 3 and 4 illustrate in front and side view, the branch passage of the control valve assembly and associated valve flap.
FIG. 5 illustrates the manner in which the valve flap is pivotally engaged with or removed from the branch passage.

A preferred arrangement for pivotal support and biasing of the flap valve member 31 is illustrated in FIGS. 3 and 4. The flap valve member 31 is provided at its upper end with a pair of opposite integrally formed axles 32, the axles 32 being received in complementary part circular openings 33 in opposite side walls 34 of the body 30. The openings 33 have a restricted entry 35 leading in from outer edges of the side walls 34. The axles 32 are formed with flats 32' to enable the axles 32 in one attitude to enter through the entry 35 to seat within the part circular openings 33 and then be captured therein.

Biasing for the flap member 31 is provided by coil springs 36 which are wound about the respective axles 32 and which are joined for ease of manufacture through common U-shaped leg 37 arranged on, the rear side of the flap 31. It will be appreciated however that the springs 36 may be separate springs. Opposite ends of the springs 36 terminate in legs 38 which abut against the inside surface of the upper wall 39 of the body 30. The flap may thus be moved between the dotted outline positions shown in FIG. 4 between a fully closed and fully open position under the influence of the bias of the springs 36. As. shown in FIG. 4, the flap 31 is of such a length that in the closed position, it is angled slightly inwardly with the lower end of the flap member 31 contacting the inner surface of the lower wall 40 of the body 30 so that the flap member 31 cannot move out of the body 30.

To enable the flap member 31 and associated springs 36 to be inserted into or removed from the body 30, the spring legs 37 and 38 are brought together and the flap 31 moved to a position substantially parallel to the wall 39. This rotates the axles 32 to a position whereby the flats 32' are aligned with the reduced diameter lead in the entry 35 permitting the flap 31 and associated springs 36 to be moved in one plane into and out of engagement with the body 30 as indicated by the arrows in FIG. 5. The strength of the springs 36 and the number of coils thereof are predetermined in relation to the particular negative pressures as required by an automatic pool cleaner.

Whist the spring leg 38 is shown as abutting the top wall 39 of the branch passage, it may engage the side wall 34. For example it may have an end or ends which can be located with in a hole or holes in the side wall 34 to provide an anchor for the spring leg 38. Alternatively, the spring leg 38 may engage a stop on the side wall 34.

Figure 7:
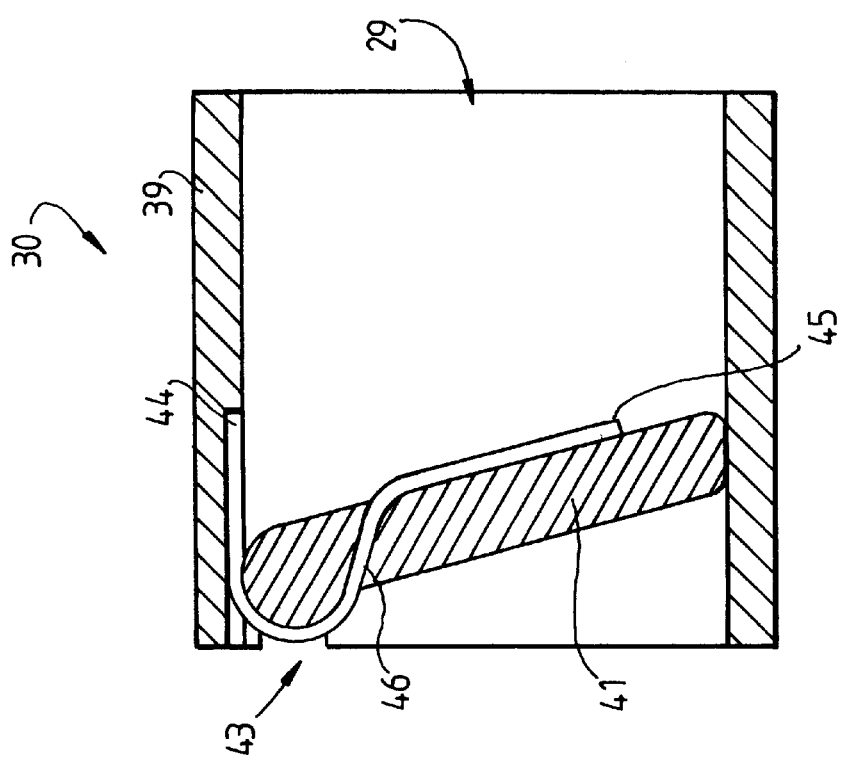
FIG. 7 is a sectional view along line A—A of FIG. 6.
Figure 6:
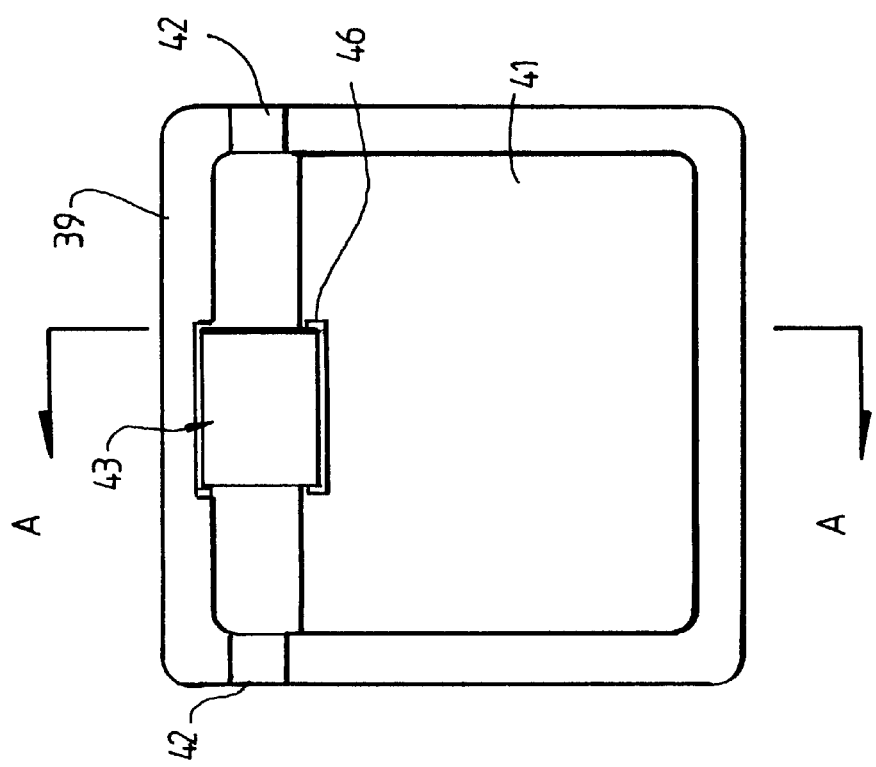
FIG. 6 illustrate in front view an alternative valve flap arrangement in the branch passage.

FIGS. 6 and 7 illustrate a further embodiment of flap valve member 41 for use with the body 30, the flap valve member 41 being provided with axles 42 to be pivotally supported in the same manner as described with reference to FIGS. 3 to 5. In this case however the biasing means is in the form of a leaf spring 43, one leg 44 of which abuts the inner side of the wall 39, suitably in a recess therein and the other leg 45 of which abuts the rear of the flap 31, the leaf spring 43 passing through a slot 46 in the flap 41.

As in the embodiment of FIGS. 3 and 4, the spring 43 normally urges the flap 31 to a closed position to block entry of water into the body 30 and passage 29 however the suction provided by the pool pump causes the flap 41 to at least partially open depending upon the suction pressure requirements of the pool cleaner and suction pressure of the pool pump. Thus a skimming action of the skimmer box 10 is maintained despite operation of the pool cleaner.

Figure 8:
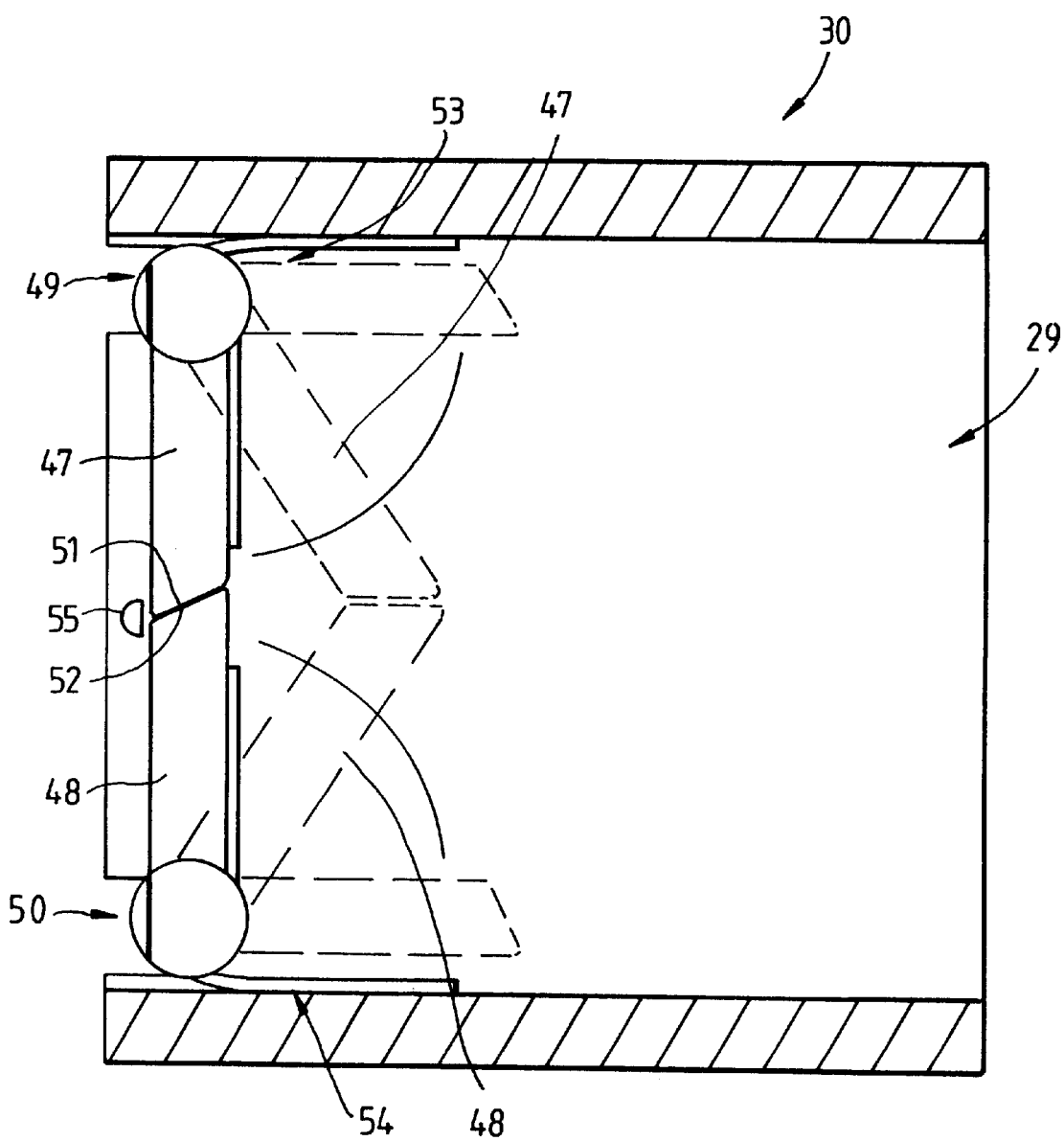
FIG. 8 illustrates in a similar sectional view to FIG. 7. an alternative form of flap valve for use in the branch passage.

FIG. 8 illustrates yet a further arrangement of flap valve arrangement for use with the body 30, comprising in this instance a pair of cooperative flap valve members 47 and 48 pivotally mounted to the upper side and lower side of the body 30 respectively at 49 and 50 using a similar pivot arrangement to that described above. The ends 51 and 52 of the flap 47 and 48 are arranged at complementary angles such that in the closed position shown, the flaps 47 and 48 are substantially coplanar with the ends 51 and 52 mating. Alternatively, the ends may be in a non-cooperating relationship in the closed position with the ends 51 and 52 spaced slightly apart. In this configuration of course, the ends 51 and 52 may extend substantially normal to the main plane of the flaps 47 and 48. Biasing springs 53 and 54 which may be in one of the forms described above bias the flaps 47 and 48 towards the illustrated position however the bias provided by the spring 53 is greater than that provided by the spring 54. A stop 55 on one or opposite walls of the branch passage 29 prevents outward movement of the flaps 47 and 48.

In operation as the suction pressure is applied to the body 30 through the body 24 of the valve assembly 23, the flap member 48 will initially open towards the dotted outline position and then if the suction pressure increase, the flap member 47 will open towards the dotted outline position to allow increased flow through the body 30 and passage 29. When the suction pressure reduces, the force of the spring 53 will initially return the flap member 47 to the FIG. 8 position and then the force of the spring 54 being lower will return the flap member 48 to the FIG. 8 position cooperating with the flap member 47.

A similar effect to that described above can also be achieved by making one flap larger than the other flap with the springs 53 and 54 in this arrangement being substantially the same.

In yet a further arrangement shown in FIG. 8, the flaps 47 and 48 may be extended in length as shown in dotted outline at 47' and 48' so that the flaps 47' and 48' in the closed position form a dihedral angle.

Figure 10:
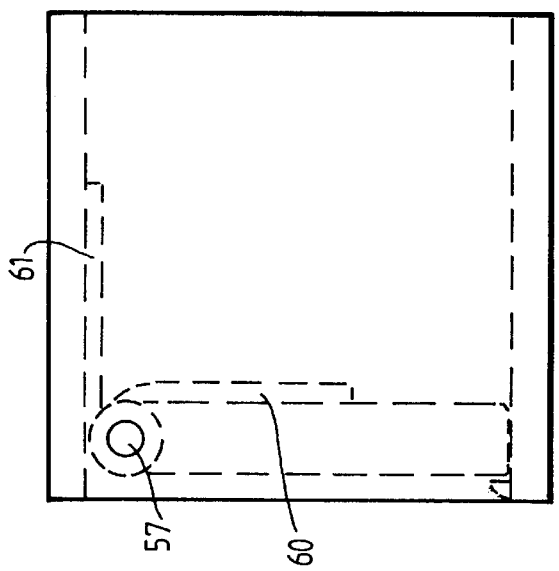
FIGS. 9 and 10 illustrate in front and side view an alternative flap valve for the branch passage.
Figure 9:
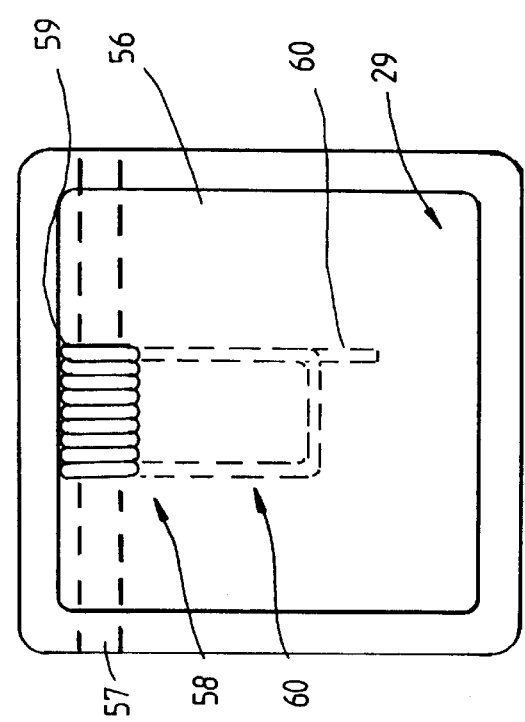

Referring now to FIGS. 9 and 10, there is illustrated an alternative flap valve arrangement wherein in this case the valve flap 56 is supported on a separate pivot pin 57 extending between opposite walls of the branch passage 29.

A biasing coil spring 58 is arranged centrally of the flap 56 and accommodated in a recess 59 therein so as to surround the pivot pin 57. Opposite legs 60 and 61 of the spring 58 engage the rear of the flap 56 and upper wall of the branch passage 29 to provide bias to the flap 56. The legs 60 and 61 may be of U-shaped form as illustrated or alternatively may be single legs as illustrated at 60'.

Figure 11:
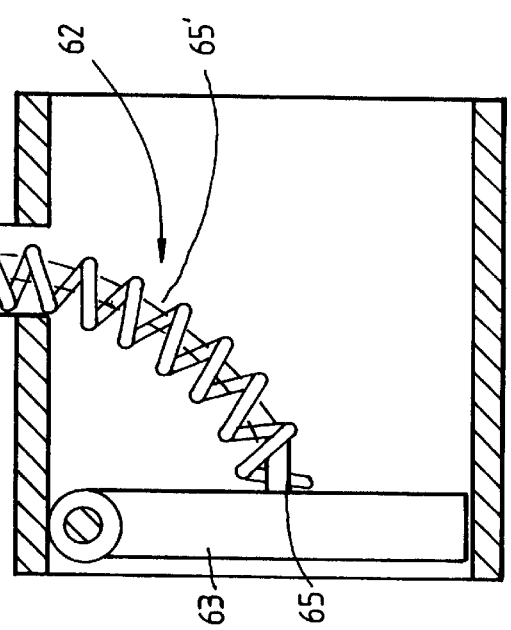
FIG. 11 illustrates in sectional view yet a further embodiment of flap valve and associated biasing arrangement.

It will be appreciated that many other biasing arrangements may be provided for the valve flap or flaps. For example, as shown in FIG. 11, a helical coil spring 62 may be provided between the valve flap 63 and extend into a housing 64 on the wall of the branch passage or other part of the valve assembly body with the other end of the spring 62 being located over a pin guide 65. The pin guide 65 may be extended as at 65' to pass through and support the spring 62 and may further extend out of the end of the housing 64 as at 66 to provide a gauge as to the extent of opening of the flap 63. In an alternative arrangement, the coil spring may be provided in a housing externally of the branch passage and an arm extending from the rear of the flap may extend into the housing for cooperation with the spring.

The operation of each of the above describe embodiments is substantially the same with the valve flaps associated with the body 30 opening to allow a suction pressure to be applied through the passage 29 to permit the skimmer box 10 to continue functioning as a skimmer. The extent of opening of the valve flaps varies in accordance with the pressure requirements of the pool cleaner.

The branch passage 29 is as shown positioned towards the lower end of the valve assembly 23 such that irrespective of the level of the water 17, the passage 29 will only draw in water and not create a vortex drawing in air which may damage the pool pump. This is enhanced by having the branch passage 29 and body 30 extending substantially at right angles to the main body 24 which ensures that the branch passage 29 will always be covered with water or other fluids in other applications. In addition, the arrangement of the bias springs of the flaps is such as not to interfere with collection of debris floating on the surface of the water and drawing in of the debris into the main passage 24 of the valve assembly 23.

The valve assembly 23 may be varied by truncating the body 24 as shown in dotted outline in FIG. 1. This enables the vacuum hose 22 to enter the skimmer box 10 via an aperture in the lid 14 or through the upper end of the chamber 12 with the lid 14 removed. This arrangement means that the weir door 18 remains closed without the hindrance of the cleaner hose thereby preventing recontamination of the body of water when the system is shut off. Vacuuming of a pool can take place with the weir door 18 closed preventing recontamination of the body of water within the pool by debris trapped within the weir.

In some cases the control valve assembly 23 may be required to be fitted in an installation where an existing vacuum hose 22 does not match the size with the valve body 24. For this purpose, tapered male/female adapters can be utilised to overcome this situation The body 24 of the valve assembly 23 is shown as a one-piece fitting, however as it will be appreciated, the elbow 25 could be made as a matching piece to compliment a straight portion of body 24.

Whilst the valve assembly of the invention is particularly suited to use with swimming pools it is applicable for use with other fluids. In such applications or in swimming pool applications, movement of the valve flap may be monitored to enable for example the mixing of another fluid, for example a chemical, when the flap pivots beyond a predetermined degree.

What is claimed is:

1. A valve assembly for use with pool cleaning apparatus connectable to a suction line, said valve assembly including a main body defining a main flow passage, an inlet to the main flow passage for connection to said pool cleaning apparatus and an outlet from the main flow passage for connection to the suction line and a branch body extending from said main body and defining a branch passage communicating with said main flow passage, said branch passage terminating in an inlet opening, valve flap means mounted to said branch body for pivotal movement between a closed position closing said branch passage and an open position in which liquid flows from said inlet opening and through said branch passage into said main flow passage, said valve flap means having a first outer side and a second inner side, pivot axle means for pivotally supporting said valve flap means in said branch passage, said pivotal means comprising a pair of opposite axles, and spring biasing means disposed substantially within said branch body and biasing said valve flap means towards said closed position, said biasing means including a pair of coil springs around said respective axles, said coil springs having first legs acting on said second inner side of said valve flap means and second legs acting against said branch body rearwardly of said valve flap means whereby said coil springs do not impede flow through said branch passage upon opening of said valve flap means, said coil springs permitting said valve flap means to pivot between said open position and said closed position in response to suction pressure requirements of said pool cleaning apparatus, wherein said coil springs are integrally formed and wherein said first legs thereof comprise a common U-shaped leg.

2. A valve assembly according to claim 1 wherein said branch body includes opposite side walls and wherein said valve flap means is pivotally mounted to said opposite side walls via said pivot axle means.

3. A valve assembly according to claim 2 wherein said opposite side walls of said branch body have sockets for receiving said axle means, and wherein said sockets have a restricted entry portion which enables said axle means to be moved into and out of said sockets only in one attitude of said axle means.

4. A valve assembly according to claim 2 wherein said branch body includes a top wall extending between said side walls, said flap means being pivotally mounted via said axle means to said side walls adjacent said top wall and said second end of said biasing means acting against an inner surface of said top wall.

5. A valve assembly according to claim 4 wherein said branch body includes a lower wall extending between said side walls and wherein the distance between said pivot axle means and a distal edge of said valve flap means is predetermined so that said valve flap means is restrained from pivoting in an outward direction beyond its closed position by contact with said lower wall.

6. A valve assembly according to claim 5 where said valve flap means is inwardly inclined towards said main body when in said closed position.

7. A valve assembly according to claim 1 wherein said branch body extends substantially at right angles from said main body.

8. A valve assembly according to claim 1 wherein said main body is tubular and wherein the inlet to said main body comprises an elbow.

9. A valve assembly for pool leaning apparatus connectable a suction line, said valve assembly including
- a main body defining a main flow passage, an inlet to the main flow passage for connection to said pool cleaning apparatus and an outlet from the main flow passage for connection to the suction line and
- a branch body extending from said main body and defining a branch passage communicating with said main flow passage, said branch passage terminating in an inlet opening, said branch body having opposite side walls and
- valve flap means pivotally mounted to said opposite side walls via a pair of opposite axles for pivotal movement between a closed position closing said branch passage and an open position in which liquid flows from said inlet opening and through said branch passage into said main flow passage, said valve flap means having an outer side and an inner side, and
- a pair of coil springs around respective said axles and biasing said valve flap means towards said closed position, said coil springs having first and second legs, said first legs acting on said inner side of said valve flap means and said second legs acting against said branch body rearwardly of said valve flap means whereby said springs do not impede flow through said branch passage upon opening of said valve flap means, said springs permitting said valve flap means to pivot between said open position and said closed position in response to suction pressure requirements of said pool cleaning apparatus.

10. A valve assembly according to claim 9 wherein said springs are integrally formed and wherein said first legs thereof comprise a common U-shaped leg.

11. A valve assembly according to claim 9 wherein said axles are formed integrally with said valve flap means.

12. A valve assembly according to claim 9 wherein said opposite side walls of said branch body have sockets for receiving said axles, and wherein said sockets have a restricted entry portion which enables said axles to be moved into and out of said sockets in one attitude of said axles.

13. A valve assembly for pool cleaning apparatus connectable to a suction line, said valve assembly including
- a main body defining a main flow passage, an inlet to the main flow passage for connection to said pool cleaning apparatus and an outlet from the main flow passage for connection to the suction line and
- a branch body extending from said main body and defining a branch passage communicating with said main flow passage, said branch passage terminating in an inlet opening,
- valve flap means mounted to said branch body adjacent said inlet opening for pivotal movement between a closed position closing said branch passage and positions in which liquid flows from said inlet opening and through said branch passage into said main flow passage,
- pivot axle means for pivotally supporting said valve flap means to said branch body, and said pivot axial means comprising a pair of opposite axles,
- spring biasing means urging said valve flap means towards said closed position, said spring biasing means comprising a pair of coil springs located around said respective axles, said coil springs having first legs acting on an inner side of said valve flap means and second legs acting against said branch body rearwardly of siad valve flap means, said coil springs permitting said valve flap means to pivot towards and away from said closed position in response to suction pressure requirements of said pool cleaning apparatus, wherein said axles are formed integrally with said valve flap means.

14. A valve assembly according to claim 13 wherein said coil spring has first and second ends, said first end being movable with said valve flap means and said second end being fixed against movement relative to said branch body.

15. A valve assembly according to claim 14 wherein said branch body is of a rectangular cross section and includes an upper wall and wherein said valve flap means is pivotally mounted via said axle means to said branch body adjacent said upper wall.

16. A valve assembly according to claim 15 wherein said branch body includes opposite side walls and wherein said pivot axle means extend between said side walls.

17. A valve assembly according to claim 15 wherein said branch body includes a lower wall and wherein said valve flap means includes a lower end remote from said pivot axle means, said lower end in said closed position being located adjacent said lower wall.

* * * * *